Oct. 2, 1945.    M. SCHNEIDER    2,385,884
SKIN ASSEMBLING METHOD AND PRODUCT
Filed July 27, 1944
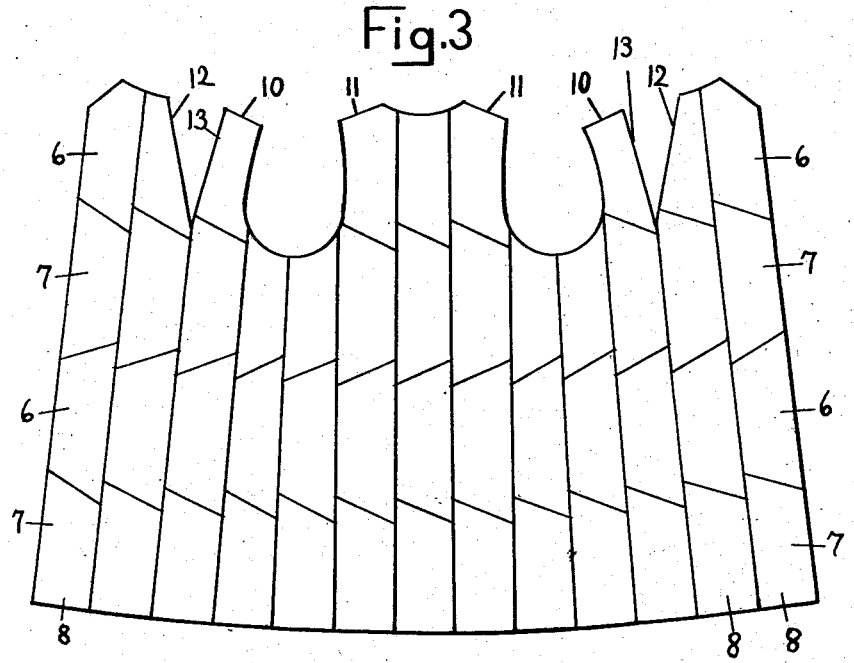
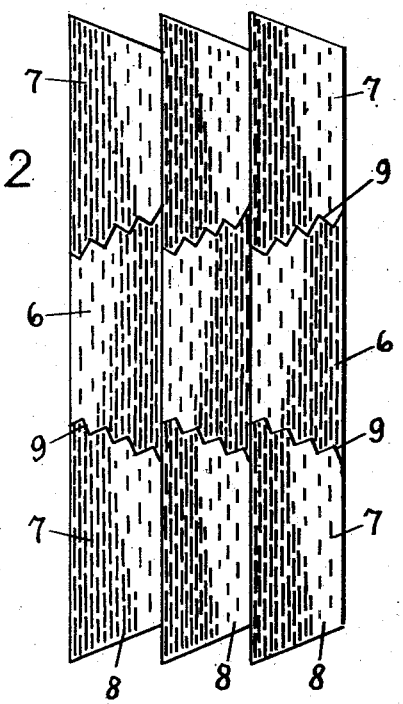
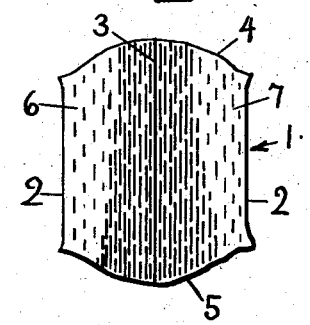
INVENTOR:
MAX SCHNEIDER
BY Maurice Block
ATTORNEY Patented Oct. 2, 1945

2,385,884

UNITED STATES PATENT OFFICE 2,385,884

SKIN ASSEMBLING METHOD AND PRODUCT

Max Schneider, Brooklyn, N. Y.

Application July 27, 1944, Serial No. 546,853

8 Claims. (Cl. 69—22)

My invention relates to the manufacture of fur coats and other garments made of fur skins, preferably of northern muskrat skins.

Objects of my invention are to avoid waste of skin portions, to use substantially all parts of the skins, inclusive of the belly parts, and to use belly and back parts in the same garment.

Other objects are to assemble a plurality of fur skins in such a manner that back parts and belly parts alternate in longitudinal direction, that these parts alternate in crossing direction, that the parts alternating in crossing direction have a relatively small width, that the alternating parts form a pleasant pattern, that they form a pattern dissimilar to any pattern that would result from an assemblage of undivided fur skins or of fur skins having belly parts affixed to other belly parts, and to produce a fur plate or a garment which has a relatively uniform appearance and which, especially when dyed, resembles a material or a garment assembled from uniform parts.

Further objects are to produce a fur material or garment which is durable, which has no straight crossing seams, which will strongly resist stress, which has a neither extremely heavy nor extremely light weight and which substantially combines the advantages of materials or garments assembled from either back parts alone or belly parts alone.

Still other objects and advantages will appear from the following illustrative description of my invention, from the appended claims and from the accompanying drawing in which:

Fig. 1 shows a plan view of a fur skin seen from the outer side, said skin being prepared in conventional manner for use in a garment and divided according to my invention.

Fig. 2 shows a plurality of fur skins of the kind shown in Fig. 1, said skins being assembled according to my invention.

Fig. 3 shows a coat assembled from fur skins according to my invention, said coat being shown spread without sleeves, the seams connecting the shoulder parts and the seams closing the V-shaped cuts at the upper front sides being shown open for the sake of more convenient representation.

Referring to the drawing, numeral 1 indicates an individual fur skin, for example a northern muskrat skin, which is stripped from the animal after being cut through the central line of the belly in conventional manner. The skin 1 has two approximately parallel edges 2 positioned symmetrically to a line 3 running through the center of the back and somewhat shorter than this central line. The head edge 4 and the rump edge 5 connect the respective ends of the edges 2 at about equal angles with the central line 3. The hairs of the back positioned at both sides of the line 3 are longer and darker (as indicated by narrower shading in Figs. 1 and 2) than the belly hairs positioned near the edges 2, the darker part being somewhat broader near the rump edge 5 than near the head edge 4.

According to my invention, a plurality of skins 1 is assembled as follows: Each individual skin is cut or divided along the line 3 into two symmetrical parts, one left half-skin 6 and one right half-skin 7. Several half-skins are assembled by connecting the rump edge of a half-skin of one kind (left or right) to the head edge of a half-skin of the other kind whereby the connected half-skins form a longish stripe consisting of alternating left and high half-skins. Several such stripes 8 are shown in Figs. 2 and 3 in vertical positions.

The stripes 8 are assembled in a position where one horizontal or crossing row is formed by left half-skins 6 and then the next crossing row by right half-skins 7 and so on, the seams between two horizontal rows consisting of interrupted oblique lines, the ends of which are connected by parts of the vertical seams whereby no horizontal or crossing seam runs in a straight direction throughout the assembled material, but the crossing seams form a zig-zag line (see Fig. 3).

The edges of the individual skins are cut to fit the adjacent edges of the other skins before the skins are assembled. This can be done without any substantial waste due to the symmetrical form of the half-skins. The rump and head edges may be cut to form smaller zig-zags 9 (see Fig. 2).

As many half-skins are assembled vertically and horizontally as are necessary to form a plate sufficiently large for the manufacture of a garment. For example, thirteen stripes 8, each consisting of four or three half-skins are assembled and cut to form the garment shown in Fig. 3. This garment is represented in a spread condition with open arm holes and open V-shaped cuts. The garment may be brought into final shape in known and usual manner, including closing the arm holes by stitching each of the two edges 10 to the corresponding edge 11, and closing the V-shaped gaps by stitching each of the two edges 12 to the adjacent edge 13.

As to be seen from Fig. 2, the darker back parts of the fur skins form a coherent pattern extending throughout the plate and surrounding relatively small belly parts. Thereby, the appearance of the plate or of the garment cut from the plate is similar to the appearance obtained if back parts are used exclusively. Preferably, the assembled fur is dyed whereupon the belly parts are hardly distinguishable from the back parts.

I desire it understood that my invention is not confined to the particular embodiment shown and described, the same being merely illustrative, and that the described method and the shown products may be modified without departing from the spirit of my invention as it is obvious that the particular embodiments and methods shown and described are only a few of the many that may be employed to attain the objects of my invention.

I desire it understood that in assembling the skins, I preferably arrange the half skins of one individual skin in the same stripe next to each other. This provides a more perfect matching.

Having described the nature of my invention, what I claim and desire to secure by Letters Patent is:

1. A fur skin assembling method comprising the steps of dividing the skins along the central back lines into symetrical half skins, each extending substantially throughout the length of the original skin and having a back edge, a belly edge, a half head edge and a half rump edge, the rump edge of one half skin being connected to the head edge of another half skin of another kind, so that alternating light and dark areas are produced.

2. A fur skin assembling method comprising the steps of dividing the skins along the central back lines into left and right half-skins, each half-skin extending substantially throughout the length of the original skin and having a back edge, a belly edge, a half head edge and a half rump edge, of connecting said half-skins, without further division, in positions so shifted parallel to the original positions that the rump edges of one kind of half-skins are connected to the head edges of the other kind of half-skins whereby the half-skins form stripes consisting of alternating left and right half-skins, and of connecting several of said stripes at their long sides.

3. A fur skin assembling method comprising the steps of dividing the skins along the central back lines into left and right half-skins, each half-skin extending substantially throughout the length of the original skin and having a back edge, a belly edge, a head edge and a rump edge, and of connecting the half-skins of the same kind without further division, in positions so shifted parallel to the original positions that the rump edges form a zig-zag line on one side and the head edges form a zig-zag line on the opposite side, each back edge being connected to the belly edge of the adjacent skin.

4. A fur skin assembling method comprising the steps of dividing the skins along the central back lines into left and right half-skins, each half-skin extending substantially throughout the length of the original skin and having a back edge, a belly edge, a head edge and a rump edge, of connecting said half-skins, without further division, in positions so shifted parallel to the original positions that the rump edges of one kind of half-skins are connected to the head edges of the other kind whereby said half-skins form stripes consisting of alternating left and right half-skins, and of connecting said strips in a position where back edges of said half-skins are adjacent to belly edges of half-skins of the same kind whereby crossing rows are formed consisting of half-skins of one kind and bordered by ziz-zag lines comprising rump edges on one side and head edges on the other side.

5. A fur skin assembling method comprising the steps of dividing the skins along the central back lines into left and right half-skins, each of said half-skins extending substantially throughout the length of the original skin and having a back edge, a belly edge, a head edge and a rump edge, of cutting the head and rump edges in zig-zag form, and of connecting said half-skins, without further division, in positions so shifted parallel to the original positions that the zig-zag rump edges of half-skins of one kind are connected to zig-zag head edges of half-skins of the other kind.

6. A fur skin assembling method comprising the steps of dividing the skins along the central back lines into left and right half-skins, each of said half-skins extending substantially throughout the length of the original skin and having a back edge, a belly edge, a head edge and a rump edge, of cutting the head and the rump edges of said half-skins in zig-zag form, of connecting said half-skins, without further division, in positions so shifted parallel to the original positions that the zig-zag rump edges of one kind of half-skins are connected to the zig-zag head edges of the other kind whereby said half-skins form stripes consisting of alternating left and right half-skins, and of connecting said stripes in a position where back edges of said half-skins are adjacent to belly edges of half-skins of the same kind whereby crossing rows are formed consisting of half-skins of one kind.

7. A garment comprising stripes consisting of fur half-skins, each of said half-skins extending substantially throughout the length of the original skin and having a back edge, a belly edge, a half head edge and a half rump edge, said four edges surrounding an undivided fur area, left and right half-skins being arranged parallel to the original direction in alternating succession, the rump edge of a half-skin of one kind being adjacent to the head edge of the next half-skin of the other kind.

8. A garment comprising a plurality of stripes each consisting of left and right half-skins arranged parallel to the original direction in alternating succession, each of said half-skins extending substantially throughout the length of the original skin and having a back edge, a belly edge, a head edge and a rump edge, said four edges surrounding an undivided fur area, the rump edge of a half-skin of one kind being adjacent to the head edge of the next half-skin of the other kind, said stripes being so positioned that half-skins of the same kind form crossing rows in which the back edge of a skin is adjacent to the belly edge of the next skin.

MAX SCHNEIDER.